United States Patent
Ono et al.

[11] Patent Number: 5,881,935
[45] Date of Patent: Mar. 16, 1999

[54] CONTAINER HOLDING DEVICE

[75] Inventors: Masayoshi Ono, Kure; Masahito Hiura, Higashihiroshima; Hisashi Kubokouchi; Yoshiaki Hamamoto, both of Hiroshima, all of Japan

[73] Assignee: Nifco Inc., Yokohama, Japan

[21] Appl. No.: 17,487

[22] Filed: Feb. 2, 1998

[30] Foreign Application Priority Data

Feb. 26, 1997 [JP] Japan ................................ 9-042688

[51] Int. Cl.⁶ .................................................. B60R 7/00
[52] U.S. Cl. ........................ 224/282; 224/926; 224/539; 224/553; 224/571; 248/311.2; 220/259; 220/531
[58] Field of Search ........................ 224/926, 539, 224/545, 548, 553, 567, 570, 571, 282; 248/311.2, 316.5, 313, 291.1; 220/908, 908.1, 531, 529, 259, 737; 229/904

[56] References Cited

U.S. PATENT DOCUMENTS

| | | | |
|---|---|---|---|
| 2,546,459 | 3/1951 | Lee | 224/926 X |
| 3,233,858 | 2/1966 | Benjamin | 248/311.2 |
| 3,391,891 | 7/1968 | Garden | 248/311.2 |
| 3,542,280 | 11/1970 | Crabtree | 229/904 |
| 3,565,320 | 2/1971 | Osborne et al. | 220/908.1 |
| 4,733,908 | 3/1988 | Dykstra et al. | 248/311.2 X |
| 5,141,194 | 8/1992 | Burgess et al. | 248/311.2 |
| 5,170,980 | 12/1992 | Burrows et al. | 224/926 |
| 5,190,259 | 3/1993 | Okazaki | 224/926 X |
| 5,328,143 | 7/1994 | Koorey et al. | 248/311.2 |
| 5,330,146 | 7/1994 | Spykerman | 224/926 X |
| 5,342,009 | 8/1994 | Lehner | 248/311.2 |
| 5,505,417 | 4/1996 | Plocher | 224/926 X |
| 5,671,877 | 9/1997 | Yabuya | 224/926 X |
| 5,718,405 | 2/1998 | Adachi | 224/926 X |
| 5,791,617 | 8/1998 | Boman et al. | 224/926 X |

FOREIGN PATENT DOCUMENTS 481797  1/1970  Switzerland ................ 220/512

*Primary Examiner*—Allan N. Shoap
*Assistant Examiner*—Gregory M. Vidovich
*Attorney, Agent, or Firm*—Kanesaka & Takeuchi

[57] ABSTRACT

A container holding device of the invention is used for holding small things and a container. The container holding device includes a base having a bottom section and an upstanding section extending upwardly from the bottom section, a support member formed near an upper surface section of the upstanding section, and an arm member rotationally attached to the support member to take first and second positions. The bottom section and the upstanding section define at least a part of a holding space in the base. At the first position, the arm member is located on the upper surface section. The arm member can be located above the bottom section, i.e. second position, by changing the position to thereby form a container holding hole together with the upstanding section.

10 Claims, 5 Drawing Sheets

CONTAINER HOLDING DEVICE

BACKGROUND OF THE INVENTION AND RELATED ART STATEMENT

The present invention relates to a container holding device for holding a container or cup.

In a container holding device, in order to provide a function for holding small things, i.e. thing holder, as well as a function for holding a container, i.e. container holder, there is provided a partition plate, which is foldable and has a container holding hole, wherein the partition plate is disposed in a concave, as disclosed in Japanese Utility Model Publication (KOKAI) No. 2-136725. When the container holding device is used as the container holder, the partition plate is bent substantially perpendicularly such that one part of the partition plate stands on a bottom wall in the concave, while the other part having the container holding hole is held along a concave opening edge. When the container holding device is used as the thing holder, the partition plate is folded, and the partition plate in the folded condition is held to stand on the bottom wall in the concave to thereby expand a space for holding small things.

However, in the above container holding device, in case the container holder is changed to the thing holder or vise versa, the partition plate must be bent or folded manually by using both hands. Thus, the changing operation between the container holder and the thing holder is troublesome.

The present invention has been made in view of the above circumstances, and an object of the invention is to provide a container holding device, wherein the changing operation between the container holder and the thing holder can be made easily.

SUMMARY OF THE INVENTION

In order to attain the above object, a first aspect of the invention provides a container holding device comprising a base including a bottom section, an upstanding section extending upwardly from the bottom section, and an upper surface section formed at an upper edge of the upstanding section, the bottom section and the upstanding section defining at least a part of a holding space in the base; a support member formed near the upper surface section; and an arm member rotationally attached to the support member to take first and second positions. The arm member is located on the upper surface section at the first position, and by change a position, the arm member can be located above the bottom section at the second position to thereby define a container holding hole together with the upstanding section.

In the first aspect of the invention, the arm member is rotationally supported on the support member located on the upper surface section of the base so that the arm member can take the first or second position relative to the support member. In the first position, the arm member is located on the upper surface section of the base, and in the second position, the arm member is located above the bottom section of the base to thereby define the container holding hole together with the upstanding section. The arm member can be rotated relative to the support member very easily even by one finger like turning a page of a book. As a result, in the second position, it is possible to operate the device as the container holder by the arm member and the upstanding section of the base, and in the first position, a space facing the upstanding section of the base can be used for storing small things. Thus, the alteration between the container holder and the thing holder can be made very easily.

In a second aspect of the invention, the arm member is supported at the first position on the support member to substantially overlap the upper surface section of the base. Thus, at the first position, the arm member does not extend from the upper surface section of the base to the space facing the upstanding section, which prevents an inlet at the upper portion of the space for the small things from being narrowed.

Further, when the arm member is located at the first position, the arm member forms a continuous surface at the upper portion of the upstanding section. Thus, the depth or capacity of the space for the small things can be made deep or increased. Also, the appearance can be improved.

In a third aspect of the invention, the arm member includes two side portions located on both sides of the support member and forms at least two container holding holes at the second position in cooperation with the upstanding section. Therefore, at least two containers can be held. Also, since the rotating position of the arm member is located at about the middle in the longitudinal direction of the arm member, the arm member can be rotated stably.

In a fourth aspect of the invention, the container holding device further comprises urging means for urging the arm member to the second position, and holding means for releasably holding the arm member in the first position. Therefore, when the arm member is located and held in the first position, the space facing the upstanding section of the base can be effectively utilized as the space for holding the small things, and if in this condition, the releasing operation is applied to the holding means, the arm member automatically takes the second position by the urging force of the urging means. Thus, even if a user holds a container at one hand, it is possible to easily and quickly change the condition of the arm member to operate as the container holder by the other hand.

In a fifth aspect of the invention, the bottom section and the upstanding section of the base constitute a part of a console box for the automobile. Therefore, while a space for the console box is utilized for the space for retaining small things, it can be used as the container holder. In the automobile, the alteration between the container holder and the thing holder can be made very easily.

In a sixth aspect of the invention, the upstanding section of the base includes circular arc sections located on both sides of the support member. The circular arc sections surely receive and hold the containers. In case the arm member is located in the second position, the containers can be held securely.

In a seventh aspect of the invention, the support member includes a pair of supporting walls, and a support section of the arm member is rotationally supported by a support shaft attached to the supporting walls. Also, soft materials are situated on the support shaft such that one soft material is located between one of the supporting walls and the support section of the arm member to be urged and closely contacted on one of the supporting walls and the support section. Therefore, it is possible to generate a frictional force at rotating portions abutting against the soft materials. When the arm member is rotated by the urging means, the arm member can be rotated slowly. Therefore, although the device is small and has a small number of parts, it is possible to add to the device a high quality sense.

In an eighth aspect of the invention, the holding means is set to engage a rotational tip portion of the arm member. Since the holding means holds a portion mostly away from the center of rotation of the arm member, i.e. longest moment arm, it is possible to hold the arm member at the lowest holding force relative to the urging force of the urging means. Therefore, the arm member can be held reliably by the holding means.

In a ninth aspect of the invention, the holding means and the support member are connected together as one unit. Therefore, the parts management can be improved. Also, since the small holding means and the support member need not be assembled together, it is possible to reduce a working amount and to eliminate mis-assembly of the parts. Therefore, the sure holding mechanism, or lock mechanism, can be provided.

In a tenth aspect of the invention, the holding means is located closer to a shift lever of the automobile than the rotational axis of the arm member. Therefore, the operation and advantages as in the first and fourth aspects of the invention can be obtained. Also, the holding means can be used easily by locating the holding means close to the shift lever, which is the easiest handling position.

On the other hand, when the arm member is in the second position, the arm member is located away from the shift lever. Therefore, the interference between the container held in the container holder and the shift lever can be prevented.

DETAILED DESCRIPTION OF A PREFERRED EMBODIMENT

Hereinafter, an embodiment of the invention will be explained with reference to the drawings.

Figure 1:
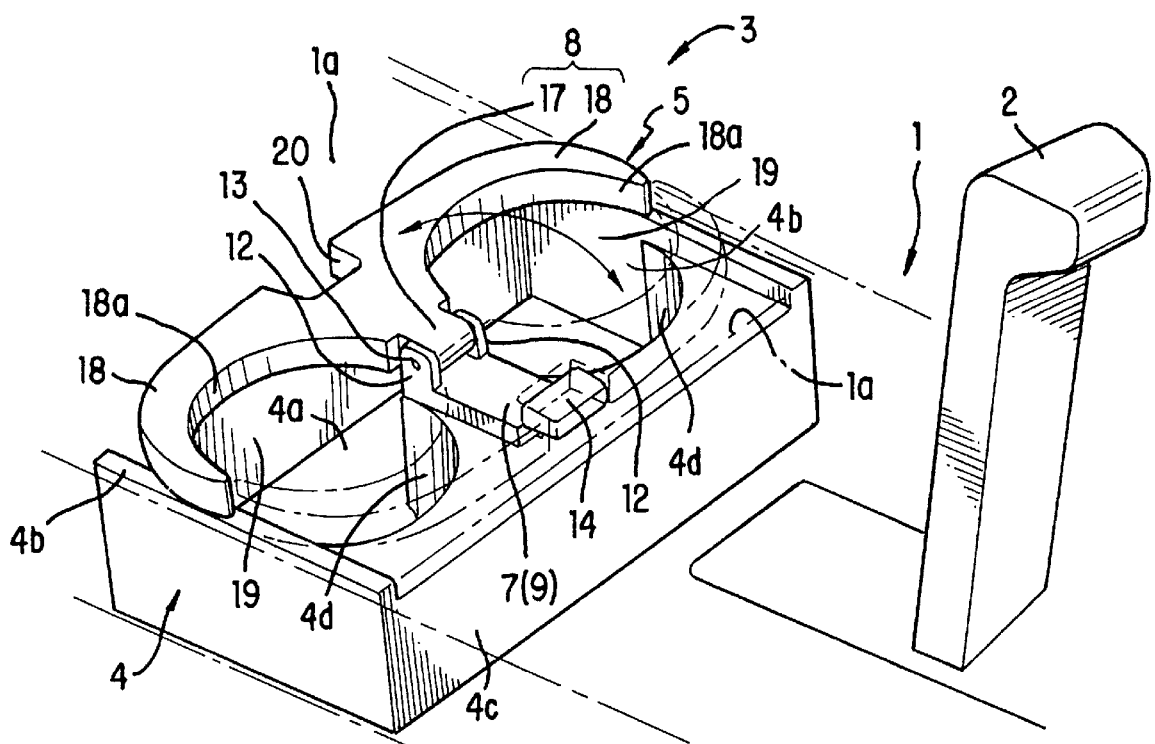
FIG. 1 is a perspective view of a cup holding device of the invention.
Figure 2:
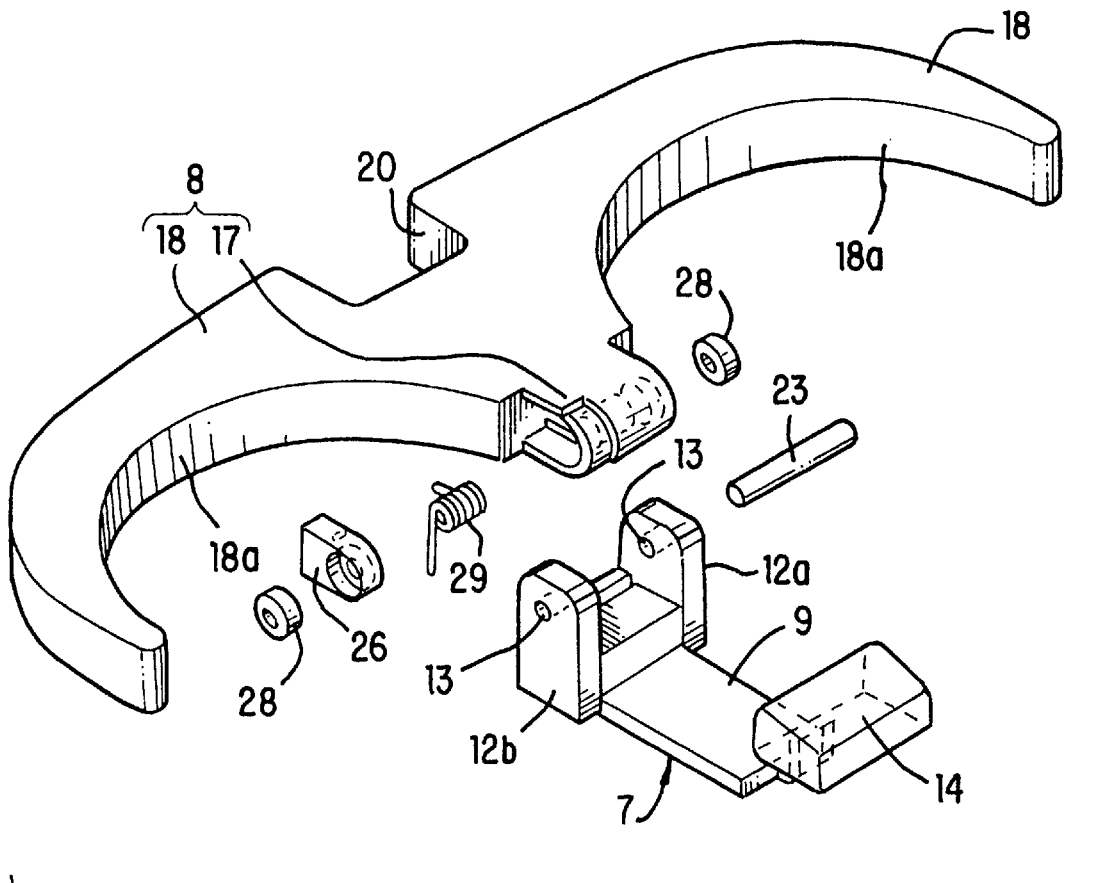
FIG. 2 is an explanatory exploded perspective view for showing connecting relations of parts of the cup holding device.

In FIG. 1, numeral 1 is a center console. In the center console 1, a retaining hole 1a is formed at a front side of a shift lever 2. The retaining hole 1a extends toward the front direction of an automobile body to generally match or correspond to the width of the center console 1.

In the retaining hole 1a, as shown in FIG. 1, a cup holding device 3 as a container holding device is disposed. The cup holding device 3 includes a retaining box 4 for forming a base, and an arm device 5.

The retaining box 4 is disposed in the retaining hole 1a at a rear side of the automobile body thereof. The retaining box 4 includes a bottom wall or bottom section 4a placed at a bottom of the retaining hole 1a, a pair of side walls 4b standing from the bottom wall 4a to an upper surface of the center console 1 along the side surfaces of the retaining hole 1a extending in the length direction of the automobile body, and a rear wall or upstanding section 4c for connecting the pair of the side walls 4b. Accordingly, the retaining box 4 does not have a front wall, so that it is possible to access or enter into the inside of the retaining box 4 from the front side of the automobile body.

In the retaining box 4, the rear wall 4c stands to the height slightly lower than the upper edges of the side walls 4b or center console 1. In the inner side of the rear wall 4c, there is formed a pair of circular arc faces 4d for respectively holding halves of containers, such as cups. In the upper surface of the rear wall 4c, two attaching holes 6 (FIG. 3) are formed between the pair of the circular arc faces 4d. The attaching holes 6 are arranged parallel in the front and rear directions of the automobile.

The arm device 5 is provided with a support member 7, and an arm member 8, as shown in FIGS. 1–5.

Figure 3:
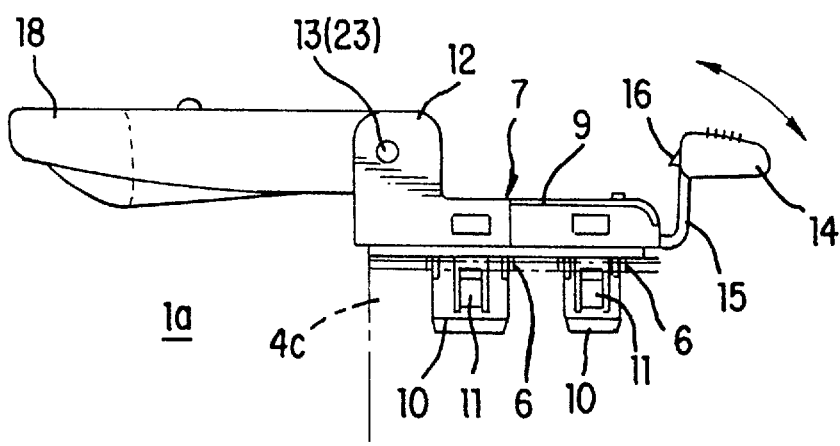
FIG. 3 is a side view for showing a condition that an arm member of the cup holding device is reversed.

The support member 7 is fixed onto the upper surface of the rear wall 4c between the pair of circular arc faces 4d. The support member 7 includes a rectangular plate section 9, and a pair of legs 10 is formed under the rear surface of the plate section 9, as shown in FIG. 3. When the pair of the legs 10 is disposed to engage the attaching holes 6, the legs 10 are held and retained in the respective attaching holes 6 by expand-contractable nails 11 formed on the legs 10 such that the plate section 9 is oriented in the front and rear directions of the automobile body.

A pair of support walls 12, i.e. 12a, 12b, is formed on the front end of the plate section 9, i.e. left side in FIG. 3. The support walls 12 extend upwardly from both sides in the width direction at the front end of the plate section 9, and the surfaces thereof face each other at a predetermined distance away from each other. The support walls 12 have retaining holes 13 at the upper portions thereof, which also face each other.

An operation member 14 as retaining means is integrally attached to the rear end of the plate section 9 through a connection plate 15. The connection plate 15 extends continuously upwardly from the rear end of the plate section 9, and the operation member 14 is integrally formed at a free end of the connection plate 15. As a result, when an outer force is applied to or released from the operation member 14, the connection plate 15 can pivot or swing relative to the end of the connection plate 15, as shown by arrows in FIG. 3. The operation member 14 includes an engaging claw 16 at a front surface thereof. The engaging claw 16 generally takes an engaging position, but when a pushing operation is applied to the operation member 14, the engaging claw 16 can take an engage-releasing position.

Figure 4:
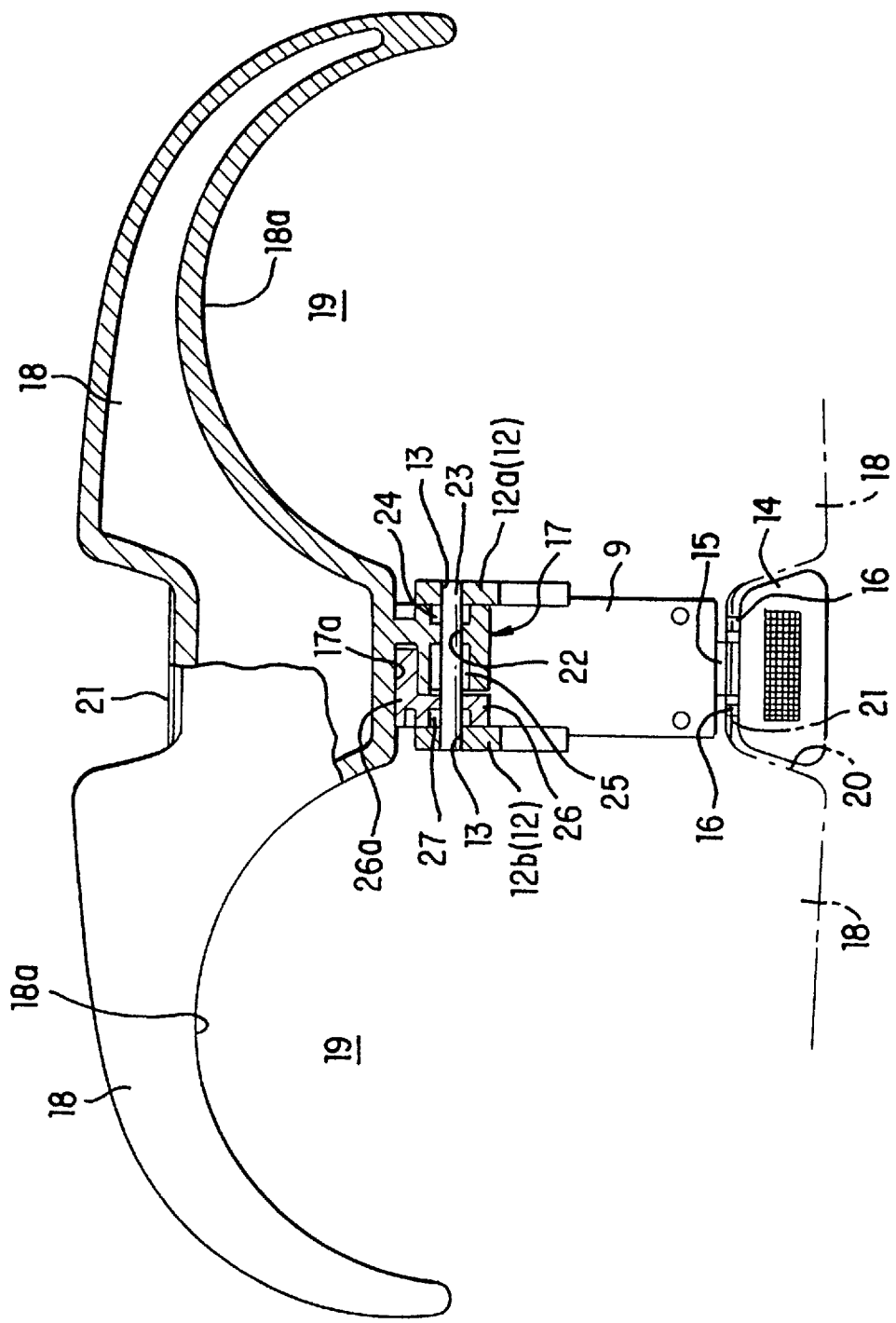
FIG. 4 is a partially cut plan view in a condition that the arm member of the cup holding device is reversed.
Figure 5:
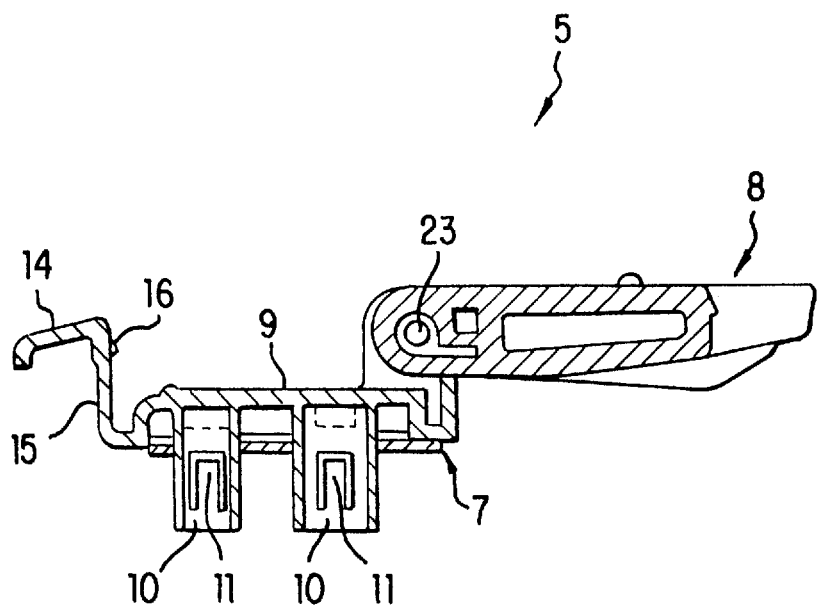
FIG. 5 is a vertical sectional view for showing a condition that the arm member of the cup holding device is reversed.

The arm member 8 is supported on the support walls 12 of the support member 7 to be able to rotate in the forward and reverse directions. The forward direction is a clockwise direction, and the reverse direction is a counterclockwise direction in FIG. 3. The arm member 8 is generally plane, and at the center relative to the longitudinal direction, i.e. right and left directions in FIG. 4, the width of the plate, i.e. upper and lower directions in FIG. 4, is elongated relative to other portions to thereby form a support portion 17 in an extended shape. Arm portions 18 extend in the longitudinal outer directions from both sides of the support portion 17 such that the support portion 17 is located in a center thereof.

The support portion 17 is rotatably supported on the support walls 12 in a condition such that a rotational axis extends horizontally. The distal ends of the arm portions 18 are located on the upper surfaces of the side walls 4b of the retaining box 4. The distal ends of the arm portions 18 do not extend laterally outwardly beyond the side walls 4b of the retaining box 4. Thus, when the arm portions 18 rotate in the forward or reverse directions, the distal ends of the arm portions 18 abut against the upper surfaces of the side walls 4b of the retaining box 4 in the condition that the distal ends of the arm portions 18 do not extend laterally outwardly beyond the side walls 4b. Thus, the plate surface of the arm member 8 can take generally horizontal posture. A reverse posture, i.e. second position, is shown in FIG. 1, and a normal posture, i.e. first position, is a condition that the reverse posture is turned in the opposite direction, wherein the arm member 8 is disposed above the rear (4b) and side (4c) walls of the retaining box 4.

In the arm portions 18, a surface for the thickness at one side where the support portion 17 projects forms a pair of a circular arc faces 18a, which constitute container holding holes 19 by cooperating the circular arc faces 4d at the rear wall 4c of the retaining box 4 when the arm member 8 is reversed as shown in FIG. 1. Side portions of the container, such as cup, can be supported by the circular arc face 18a of the arm portion 18 and the circular arc face 4d of the rear wall 4c of the retaining box 4.

Further, the arm member 8 includes a cutout 20 at a side opposite to the support portion 17 relative to the width direction thereof. The cutout 20 has a size to receive the operation member 14 at the positive or regular posture of the arm member 8, and includes an engaging portion 21 slightly projecting at an inner surface thereof. The engaging portion 21 can engage the engaging claw 16 of the operation member 14 against the urging force of the connection plate 15 at the time of the normal posture of the arm member 8. When the engaging portion 21 engages the engaging claw 16, the normal posture of the arm member 8 is maintained (imaginary line in FIG. 1).

The support relation between the support portion 17 of the arm member 8 and the pair of the support walls 12 will be explained with reference to FIGS. 2 and 4–7.

The support portion 17 of the arm member 8 includes a through hole 22 penetrating in the longitudinal direction (right and left directions in FIG. 4) of the arm member 8, to which a support shaft 23 is inserted. The support shaft 23 is engaged and retained in the retaining holes 13 of the support walls 12 at both outer end portions, so that the support portion 17 of the arm member 8 is rotationally supported on the pair of the support walls 12 through the support shaft 23.

The through hole 22 is enlarged at one side in the axial direction thereof to form a soft material receiving hole 24, and at the other side to form a spring receiving hole 25. One support wall 12a in the support walls 12 faces an opening side of the soft material receiving hole 24, and a spacer 26 is disposed at an opening side of the spring receiving hole 25. A soft material receiving hole 27 is also formed at the outer surface side of the spacer 26. The other support wall 12b in the support walls 12 faces the soft material receiving hole 27.

In the soft material receiving holes 24, 27, annular soft materials 28 closely engaged on the outer surface of the support shaft 23 are retained. A coil spring 29 is received in the spring receiving hole 25 in the condition that the coil spring 29 is disposed over the support shaft 23. In FIG. 4, the soft materials 28 and the coil spring 29 are omitted. A separating force between the support portion 17 of the arm member 8 and the spacer 26 is formed by an urging force of the coil spring 29 in the axial direction, so that the soft material 28 in the support portion 17 of the arm member 8 contacts the support wall 12a with a pressure, and the soft material 28 in the spacer 26 contacts the other support wall 12b with a pressure. Therefore, frictional forces are formed at the respective rotation members contacting the soft materials 28.

Figure 6:
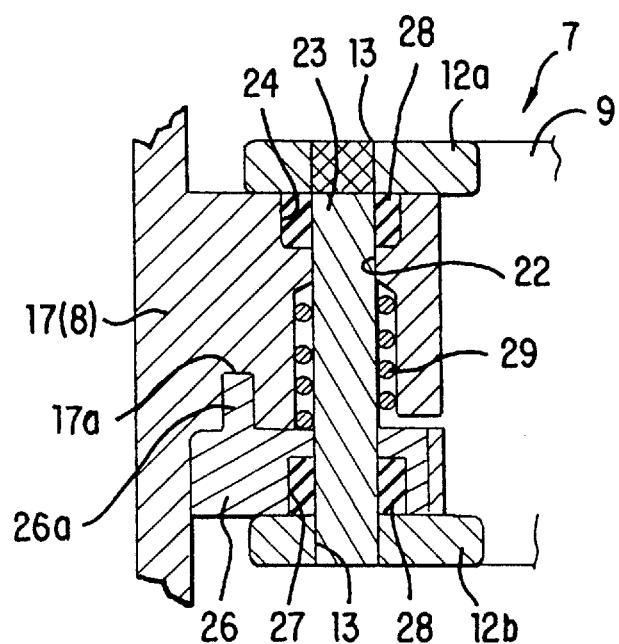
FIG. 6 is a lateral sectional view for explaining a supporting relation between a supporting portion of the arm member and a pair of supporting walls.

Incidentally, in FIGS. 4 and 6, numeral 17a indicates a guide hole formed at the support portion 17, and numeral 26a indicates a projection guided by the guide hole 17a.

Figure 7:
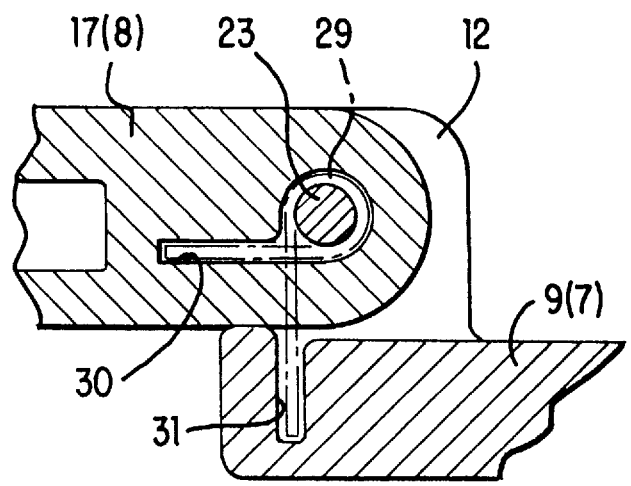
FIG. 7 is a vertical sectional view for explaining a supporting relation between the support portion of the arm member and the pair of he supporting walls.

Further, as shown in FIG. 7, one end of the coil spring 29 is held in an engaging hole 30 formed by extending a part of the through hole 22 of the support portion 17 of the arm member 8. The other end of the coil spring 29 extends downwardly between the spacer 26 and the support portion 17 of the arm member 8, and the extended portion thereof is held in an engaging hole 31 formed in an upper surface of the support member 7. Accordingly, the arm member 8 is always urged to the reverse direction around the support shaft 23. The urging force is set to be greater than the total frictional forces at the rotating portions contacting the soft materials 28 but less than a force to release an engagement between the engaging portion 21 and the engaging claw 16.

In the cup holding device 3, when the operation member 14 is pushed in the normal posture where the engaging portion 21 of the arm member 8 engages the engaging claw of the operation member 14, as shown in the imaginary line in FIG. 1, the engagement between the engaging portion 21 of the arm member 8 and the engaging claw 16 of the operation member 14 is released. As a result, the arm member is rotated reversely by the urging force of the coil spring 29, so that the arm portions 18 abut against the upper edges of the side walls 4b of the retaining box, and also, a part of the support portion 17 of the arm member 8 abuts against the upper surface of the support member 7, to thereby become the reverse posture. Thus, the arm portions 18, i.e. circular arc faces 18a, and the rear wall 4c of the retaining box, i.e. circular arc portions, constitute the container holding holes 19. Accordingly, the cup holding device 3 operates as a cup holder. When a container, such as cup, is inserted into the container holding hole 19, the side portions of the container are held by the arm portion 18 and the rear wall 4c of the retaining box 4.

In this case, since the frictional forces are generated between the respective rotating portions and the soft materials 28, the arm member 8 reversely rotates gently, not rapidly.

In the condition that the arm member 8 is in the reverse posture, when the arm member 8 is rotated in the positive direction against the urging force of the coil spring 29 to engage the engaging claw 16 of the operation member 14 with the engaging portion 21 of the arm member 8, the arm member 8 is held in the normal posture. Thus, the arm member 8 comes to be disposed above the upper edge of the rear (4c) and side (4b) walls of the retaining box, so that the opening of the retaining hole 1a in the center console 1 is enlarged. As a result, the retaining hole 1a can be used easily as a space for retaining small things.

While the invention has been explained with reference to the specific embodiment of the invention, the explanation is illustrative and the invention is limited only by the appended claims.

What is claimed is:

1. A container holding device, comprising:

a base including a bottom section, an upstanding section extending upwardly from the bottom section, and an upper surface section formed at an upper edge of the upstanding section, said bottom section and the upstanding section defining at least a part of a holding space in the base, a support member connected to the upstanding section near the upper surface section, and an arm member rotationally attached about a substantially horizontal axis to the support member between first and second substantially horizontal positions, said arm member being located on the upper surface section at the first position and being located by rotationally changing a position above the bottom section to take the second position to thereby define a container holding hole together with the upstanding section.

2. A container holding device according to claim 1, wherein said arm member is supported on the support member such that the arm member substantially overlaps the upper surface section at the first position.

3. A container holding device according to claim 1, wherein said arm member includes two side portions located on both sides of the support member and forms at least two container holding holes at the second position in cooperating with the upstanding section.

4. A container holding device according to claim 1, further comprising urging means attached to the arm member for urging the arm member to the second position, and holding means situated adjacent to the support member for releasably holding the arm member in the first position.

5. A container holding device according to claim 1, wherein said bottom section and the upstanding section of the base constitute a part of a console box for a vehicle.

6. A container holding device according to claim 3, wherein said upstanding section of the base includes circular arc sections located on both sides of the support member, said circular arc sections being adapted to receive and hold containers.

7. A container holding device according to claim 4, wherein said support member includes a pair of supporting walls; said container holding device further includes a support shaft attached to the supporting walls for rotationally supporting a support section of the arm member, and soft materials, each being respectively situated on the support shaft between one of the supporting walls and the support section of the arm member to be urged and closely contacted on one of the supporting walls and the support section.

8. A container holding device according to claim 4, wherein said arm member includes a tip portion for rotation, said holding means engaging the tip portion for holding the arm member in the first position.

9. A container holding device according to claim 4, wherein said holding means and the support member are connected together as one unit.

10. A container holding device according to claim 4, wherein said holding means is located at an end of the base, and a rotational axis of the arm member is located above the base away from the holding means.

* * * * *